UNITED STATES PATENT OFFICE.

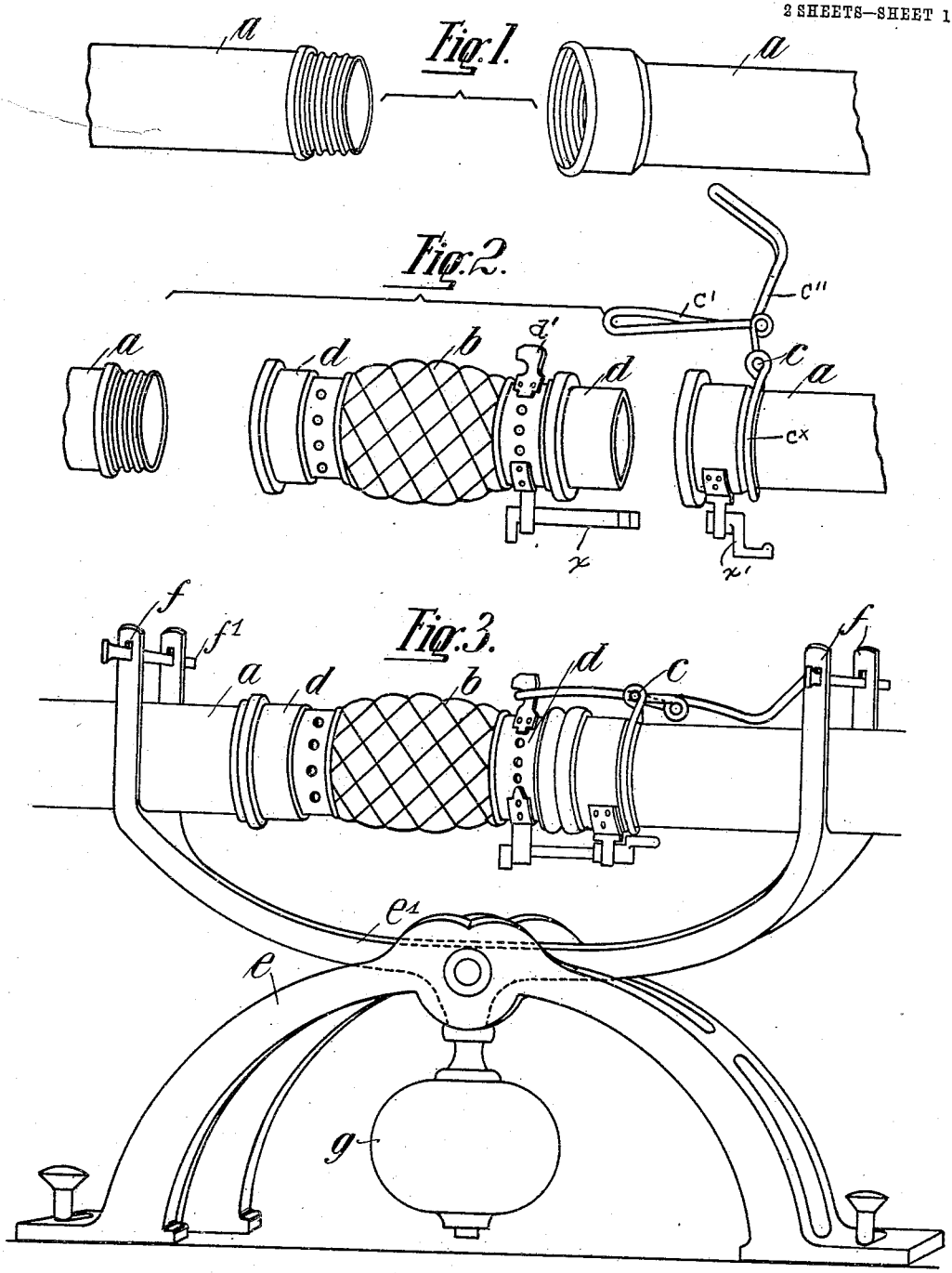

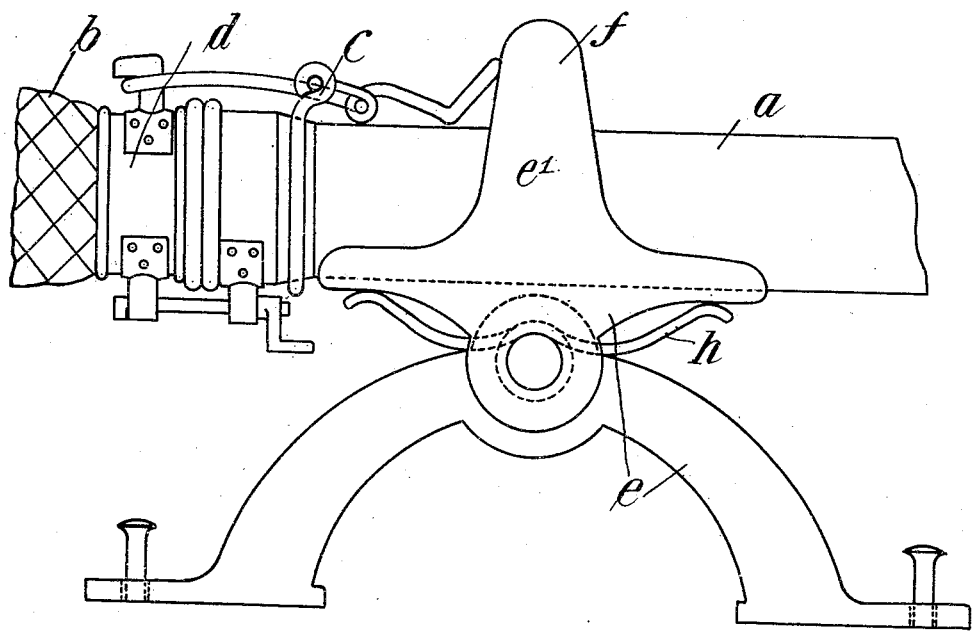

EUGEN BOERMEL, OF BERLIN, GERMANY.

PIPE CONNECTION AND SUPPORT.

No. 930,034.         Specification of Letters Patent.         Patented Aug. 3, 1909.

Application filed April 10, 1909. Serial No. 489,189.

*To all whom it may concern:*

Be it known that I, EUGEN BOERMEL, sculptor, a subject of the King of Prussia, residing at 10 Hagenstrasse, Berlin-Grunewald, Germany, have invented new and useful Improvements in Pipe Connections and Supports, of which the following is a specification.

My invention is designed to provide a connection and support for pipes such as those used for water mains or conduits so as to allow for certain movement of the pipe sections in relation to each other so as to prevent rupture or the tendency to rupture in the case of earthquake shocks.

I do not limit myself to the use of the invention to water pipes as it may be found desirable to apply the invention to pipes for conveying gas, oil or the like.

My invention includes a flexible connection between pipe sections; a movable support for the pipe sections whether located at the ends or intermediate of the ends and certain details of construction hereinafter more fully described.

In the accompanying drawing, Figure 1 shows the ends of two ordinary pipe sections threaded for engagement. Fig. 2 illustrates the same pipe ends with my improved intermediate flexible connection. Fig. 3 illustrates the parts brought together and with a support for the ends of the adjacent pipe sections. Fig. 4 is a modification of the movable support for the pipe sections.

$a, a$, may illustrate any ordinary form of pipe sections threaded for ordinary engagement. Instead however, of connecting the pipes together so as to make the ordinary rigid structure, so liable to rupture in the event of the sinking of the earth or support as in the case of an earthquake, I connect the adjacent ends flexibly by an intermediate section $b$, which is made of any suitable flexible material reinforced by a spiral spring or wire gauze in any suitable manner so as to strengthen the section without interfering with its elasticity.

The ends of the section are provided with sockets or couplings $d$ forming any suitable connection with the ends of the pipe sections $a$. For instance, in Fig. 2 the coupling $d$ on the left may have an ordinary threaded connection with the pipe $a$, while upon the right the socket $d$ may enter the pipe $a$ and be held in place by the attaching device $c$, or any equivalent means. This gives a certain amount of elasticity to the conduit and allows bending action through the medium of the connection $b$, preventing rupture of the conduit under the circumstances stated. The attaching device includes a lug $d'$ on the intermediate section which is adapted to be engaged by a loop $c'$ hinged to the handle portion $c''$, hinged to a ring $c^\times$ which is carried by the pipe section $a$. Opposite to this attaching device I show another attaching device consisting of two interlocking elements $x$, $x'$ carried by lugs on the sections $d$ and $a$.

Where it is desired to support the conduit above the ground I may utilize such a device as that shown in Fig. 3. This consists of a supporting base $e$, having a rocking support $e'$ pivoted to the base $e$, having arms $f$, between which the pipe sections are held and prevented from being displaced by bars $f'$. A weight $g$ balances the support $e'$ and keeps it normally in a horizontal position.

In Fig. 4 I have shown a modification of this device, and in lieu of the weight for keeping the pipe support $e'$ in horizontal position I utilize a spring $h$.

What I claim is:

1. A pipe connection and support comprising two pipe sections a flexible coupling connecting the sections together, and a support for the sections capable of rocking movement.

2. A pipe connection and support comprising a base, upwardly projecting arms pivotally mounted on the base so as to have rocking movement, and means for yieldingly holding said arms in their central position.

3. A pipe connection and support comprising two pipe sections, a flexible coupling connecting the ends of said sections together, a support for said sections comprising a base, a rocking support pivoted on said base and having its upwardly extending ends engaging with each pipe section, and means for normally holding the rocking support in its central position.

In testimony whereof I have signed my name to this specification in the presence of two subscribing witnesses.

EUGEN BOERMEL.

Witnesses:
 WOLDEMAR HAUPT,
 HENRY HASPER.